United States Patent Office 3,211,708
Patented Oct. 12, 1965

3,211,708
OIL-IN-WATER BEAD POLYMERIZATION OF
WATER-SOLUBLE MONOMERS
Johann Wolfgang Zimmermann and Alfred Kühlkamp, Frankfurt am Main, Germany, assignors to Farbwerke Hoechst Aktiengesellschaft vormals Meister Lucius & Brüning, Frankfurt am Main, Germany, a corporation of Germany
No Drawing. Filed Sept. 12, 1961, Ser. No. 137,510
Claims priority, application Germany, Sept. 14, 1960, F 32,114
16 Claims. (Cl. 260—78.5)

The present invention relates to a process for the polymerization of water-soluble monomers.

The polymerization of water-soluble monomers, in particular that of acrylamide, which is radical-initiated, is usually carried out as solution polymerization in water or as precipitation polymerization in an organic solvent in which the monomer is soluble but in which the resulting polymer is insoluble.

Suspension or emulsion polymerizations of the oil-in-water type are limited to the copolymerization of water-soluble monomers with water-insoluble monomers.

According to the prior art the solution polymerization of water-soluble monomers has the advantage over the precipitation polymerization that it enables the high degrees of polymerization to be obtained which are required for most purposes of application whereas in a precipitation polymerization the degree of polymerization remains in general rather low.

However, at the same time solution polymerization has considerable disadvantages. The reaction has to be carried out in a relatively dilute solution, that is to say the concentration of the monomer in the solution must not be higher than about 3 to 10%, since the exothermic polymerization in a concentrated solution is very difficult to control and the required high degree of polymerization of the product leads to solutions which are so viscous that they can be handled only after having been diluted to a high degree.

In solution polymerization of acrylamide the dissipation of the heat of reaction is of great importance since, as is known, at an elevated temperature the amide-groups undergo an intermolecular reaction by which they are transformed into imides with the splitting off of ammonia, and a cross-linked, insoluble and consequently unserviceable product forms.

Since dilute polymer solutions are very uneconomical, efforts have been made to prepare pulverulent polymers which are as soluble in water as possible. U.S. Patent 2,486,191 describes, for example, the precipitation of the polymer dissolved in water which is brought about by the addition of organic solvents to the aqueous solution. This method of precipitation has the drawback that larger amounts of solvents are used.

Attempts have also been made to modify the precipitation polymerization in such a manner that by the addition of water to the reaction medium polymers of higher molecular weight are obtained. This leads to a certain, though limited increase of the degree of polymerization, for in the presence of too large a quantity of water the water-soluble polymer does not precipitate in the state of powder but agglomerates to form an unserviceable lump.

Belgian Patent 585,256 describes a reverse method for suspension or emulsion polymerization of water-soluble monomers, according to which a water-soluble monomer in the form of a relatively concentrated aqueous solution is dispersed and polymerized in a solvent which is not miscible with water. The process has the disadvantage that in water-in-oil dispersions special dispersing agents of high molecular weight have to be used in order that the necessary stability at the polymerization temperature is imparted to the dispersions. This stability of the dispersions is most favorable when solvents are used whose boiling point is higher than that of water, for example, toluene and xylene. The use of such solvents involves, however, an unfavorable dissipation of the heat of reaction, in particular in cases in which large polymerization batches are used, which leads to chemical alterations of the polymer, for example, in particular in the case of polyacrylamide.

The present invention is based on the observation that vinyl and acrylic or methacrylic monomers which are soluble in water in any ratio, can be polymerized into water-soluble bead or granular polymers in a particularly advantageous way by polymerizing an emulsion which contains a small quantity of one or more ordinary non-ionic and/or ionic emulsifiers and which comprises an aqueous solution of the momoners as the outer phase and an organic solvent which is soluble in water to at most 15% by weight as the inner phase, the polymerization being carried out in the presence of free radical polymerization catalysts or activators.

According to a preferred way of carrying out the process of the present invention (a) An organic solvent which is soluble in water of 50° C. to an extent of less than 15% or which is not miscible with water is emulsified in an aqueous solution of a vinyl, acrylic or methacrylic monomer with the addition of small quantities of one or more usually applied ionic and/or non-ionic emulsifiers to yield an oil-in-water emulsion, and (b) The emulsion thus obtained is polymerized after the addition of a water-soluble free radical polymerization catalyst, while stirring under the necessary reaction conditions and the water-soluble polymer precipitates from the mother liquor in the form of beads which can be filtered.

Organic solvents are preferred which fulfill at least one of the following requirements:

(1) The dissolving action on the water-soluble monomer to be polymerized and on the polymer obtained from the monomer is to be as small as possible, that is to say that at most 20 parts by weight of monomer or 10 parts by weight of polymer may dissolve in 100 parts by weight of the organic solvent.

(2) In view of a good dissipation of the heat of polymerization the boiling point of the organic solvent or that of the azeotrope of the solvent with water is preferably to be below that of the aqueous monomer solution, solvents having a boiling point within the range of 50° C. to 100° C. being preferred.

(3) In order to ensure a safe execution of the process according to the invention on an industrial scale the solvent is preferably to be difficulty combustible or non-combustible.

Suitable solvents are, for example, chlorinated hydrocarbons which preferably contain 1 to 2 carbon atoms, in particular carbon tetrachloride, dichloroethane, trichloroethylene; aliphatic and cycloaliphatic hydrocarbons such as gasoline fractions boiling up to 100° C., hexane, and cyclohexane; aromatic hydrocarbons such as benzene, toluene, xylene; esters, in particular esters of saturated aliphatic monocarboxylic acids containing 1 to 3 carbon atoms and aliphatic saturated monohydric alcohols containing 1 to 5 carbon atoms.

The said solvents may also be used in admixture with one another.

As vinyl, acrylic and methacrylic monomers which are soluble in water in any ratio and which may be polymerized by the process according to the present invention there may be mentioned all ethylenically unsaturated water-soluble compounds which undergo a radical-initiated polymerization, preferably acrylamide but also methacrylamide, acrylic acid, methacrylic acid, ethenesulfonic acid and the alkali salts of these acids; the water-soluble N-substituted acrylamide and methacrylamides, for example, N-methylacrylamide, and sulfonated styrenes.

These monomers may be used alone or in admixture with one another or in admixture with other water-soluble monomers which when used alone cannot be polymerized with radical forming agents, for example, maleic acid diamide or crotonic acid. The said water-soluble vinyl, acrylic and methacrylic monomers according to the invention may also be copolymerized with monomers which are sparingly soluble in water, for example vinyl esters, preferably esters of vinyl alcohol and saturated aliphatic monocarboxylic acids containing 1 to 4 carbon atoms; esters of acrylic acid or methacrylic acid and aliphatic saturated monohydric alcohols containing 1 to 4 carbon atoms; acrylonitrile or methacrylonitrile, in which case the monomers that are sparingly soluble in water are to be present only in quantities which are so small that the polymer which forms remains soluble in water at least at temperatures of up to 50° C. The concentration of the aqueous solution of the monomers is in general within the range of 20 to 80% by weight in cases in which liquid water-soluble monomers are used, and within the range of 20% by weight to the concentration of saturation in cases in which solid water-soluble monomers are used.

The proportion of quantities by weight of the aqueous monomer solution to the organic solvent serving as disperse or inner phase is in general within the range of 1:0.5 to 1:10, preferably 1:0.7 to 1:5.

Particularly suitable emulsifiers are the polyhydroxyethylated compounds which are known as non-ionic emulsifiers, for example, hydroxyethylated nonyl phenols, hydroxyethylated long-chain monocarboxylic acids and fatty acids, fatty acid esters of cyclic monoanhydrosorbitol and hydroxyethylated fatty acid esters of cyclic monoanhydrosorbitol. The usually applied cationically active and anionically active emulsifiers, for example, lauryl sulfate or sulfosuccinic acid ester, may also be used, if desired, in admixture with substances of the non-ionic type. The quantity of emulsifier added is in general within the range of 0.01 to 5% by weight, preferably 0.1 to 2% by weight, calculated on the total polymerization batch.

The emulsifier type which is most suitable for use in a given case is ascertained by simple preliminary tests. It should, however, be noted that only oil-in-water emulsions are suitable for use in the process of the present invention. These emulsions can easily be recognized by their capacity of being diluted with water.

In contradistinction thereto the water-in-oil emulsions which cannot be used in the process of the present invention and which may be prepared, for example, in the manner described in Belgian Patent 585,256 can easily be recognized by the fact that they are not miscible with water but that they are miscible with the solvent serving as oil phase.

Suitable systems comprising water-soluble vinyl, acrylic or methacrylic monomers, water, a solvent which is not miscible with water and an emulsifier are, for example: acrylamide/water/carbon tetrachloride/hydroxyethylated monolauric acid ester of the cyclic anhydrosorbitol; acrylamide/water/petroleum ether boiling within the range of 60° C. to 90° C. under normal pressure/hydroxyethylated nonyl phenol; acrylic acid/water/hexane/hydroxyethylated phenol.

The polymerization reaction is initiated by means of the usual water-soluble polymerization catalysts which readily decompose into radicals. They are used in quantities which in general are within the range of 0.001 to 2.0%, the percentages being calculated on the weight of the monomer or monomers. As examples of such catalysts there may be mentioned alkali persulfates, alkylhydroperoxides, hydrogen peroxide. They are used either alone or in the form of redox systems, that is to say in admixture with compounds having a reducing effect, for example, alkali metabisulfites or sodium formaldehyde sulfoxylate. Polymerization may also be activated by irradiation.

The oil-in-water emulsion is prepared in a vessel provided with stirring means under an atmosphere of nitrogen, the order of sequence in which the components are added being of no importance. It is also possible, for example, first to prepare an emulsion from the solvent and the water in the presence of an emulsifier and to dissolve the monomer in this emulsion.

After addition of the catalyst polymerization is initiated by heating while stirring. When large charges are used a part of the emulsion is preferably placed into a vessel provided with stirring means and reflux condenser before the beginning of the reaction and the remaining part of the emulsion is gradually pumped in after the reaction has started. The oil-in-water emulsion may also be polymerized continuously.

The formation of the oil-in-water emulsion may also be brought about simultaneously with the polymerization by introducing for example, the organic phase simultaneously with the aqueous catalyst-containing monomer solution in an aliquot proportion into the polymerization vessel.

The reaction temperature is in general within the range of 20° C. to the boiling point of the solvent used or the azeotrope thereof with water. It is preferably within the range of 30° C. to 100° C. Polymerization is suitably carried out under the atmosphere of an inert gas such as nitrogen and lasts for about 0.5 to 6 hours.

During the polymerization which is carried out while stirring continuously the viscosity of the oil-in-water emulsion is increased whereupon the polymer which contains water is obtained in the form of beads or granular products.

After the end of the polymerization the beads or the granular product are filtered off from the mother liquor, if desired, washed with water and dried. If the crude product is to be washed there are preferred, in addition to the organic solvent used as the oil phase, washing liquids which have no capacity of dissolving the polymer but have a capacity of dissolving the monomer. The washing liquids may be miscible with water. Drying is brought about in usual manner, for example, by drying in a vacuum drier, in a whirling layer drying apparatus or on a roller drier.

After the filtration the mother liquor can be used again for the next polymerization batch.

The present invention was made possible by a number of unexpected findings.

(1) It was not to be foreseen that under the conditions of the polymerization an oil-in-water emulsion would remain stable even at the boiling point of the disperse organic phase. This could be foreseen all the less since preferably the quantitative proportion of the oil phase is larger than that of the outer aqueous phase.

(2) It was not to be expected that the water-soluble polymer forming in the coherent aqueous phase would decompose into small beads when the desired degree of polymerization was attained, which beads have no tendency towards lump formation or cornification, either when filtered from the mother liquor or when dried.

(3) It was not to be expected that in the polymerization of water-soluble monomers, especially acrylamide, with chlorinated hydrocarbons serving as the oil phase the reaction directly leads to the formation of products of high molecular weight which are free from chlorine, this being contrary to the known fact that in the polymerization batch chlorinated hydrocarbons have a marked tendency of transferring radicals and normally yield telomers.

The process according to the present invention has the following advantages:

(1) Simple way of preparing the oil-in-water emulsion by means of commercial emulsifiers.

(2) Very good dissipation of the heat of polymerization by way of the boiling oil phase which has a preferred boiling point below 100° C.

(3) Possibility of using non-combustible chlorinated hydrocarbons as oil phase, without a telomerization taking place.

(4) Possibility of varying the degree of polymerization of the water-soluble polymer in usual ways.

The water-soluble polymers which are prepared by the process according to the invention may be used for many purposes, for example, as textile auxiliaries such as sizing, dressing and finishing agents, protective colloids, thickeners, flocculation agents and binding agents.

The following examples serve to illustrate the invention but they are not intended to limit it thereto, the parts being by weight.

Example 1

*Apparatus.*—Vessel heated by means of a water-bath and provided with an anchor-type agitator, reflux condenser and connecting piece for the introduction of nitrogen.

3000 parts of petroleum ether boiling at a temperature within the range of 60° C. to 90° C. and a solution of 780 parts of acrylamide in 780 parts of water were stirred under an atmosphere of nitrogen to yield an oil-in-water emulsion while 30 parts of nonyl phenol which was hydroxyethylated with 13 mols of ethylene oxide were added.

(The proof of an oil-in-water emulsion can be established in the following way: Some drops of the emulsion which are poured into some cubic centimeters of water distribute over the whole liquid. When the same emulsion is poured into petroleum ether two separate layers form.)

0.1 part of sodium metabisulfite and 0.1 part of potassium persulfate, each of which was dissolved in 5 parts of water, were introduced while stirring into the emulsion prepared in the way described above.

One fifth of the emulsion obtained was placed into the polymerization vessel before the beginning of the reaction and the reaction was initiated by heating this part of the emulsion to a temperature within the range of 55° C. to 60° C.

The remaining four fifths of the emulsion were introduced in the course of about 2 hours via a dropping funnel into the polymerization vessel while stirring well. The temperature of the water bath was adjusted in such a manner that during the exothermic polymerization a weak reflux could be noticed in the reflux condenser.

After the addition of the emulsion was terminated the batch was maintained for another hour at reflux temperature.

The reaction mixture which was cooled to about room temperature was suction-filtered and the bead-shaped, water-containing polymer was dried at 40° C. under a pressure of 20 mm./Hg.

*Analyses.*—Content of non-polymerized monomer determined in the mother liquor and in the solid product: <1%.

Viscosity of a solution of 1% strength in water at 20° C.: 20 centipoises.

Example 2

*Apparatus.*—Analogous to that described in Example 1. An oil-in-water emulsion was prepared from 600 parts of n-hexane, 6 parts of nonyl phenol which had been hydroxyethylated with 13 mols of ethylene oxide, and a solution of 150 parts of acrylic acid of 98% strength in 150 parts of water.

The polymerization was carried out in the manner described in Example 1 after the addition of 0.02 part of potassium persulfate dissolved in 5 parts of water.

The granular product of polyacryic acid which was filtered off was washed with a small amount of hexane and dried at 60° C. under a pressure of 20 mm./Hg.

The viscosity of an aqueous solution of 1% strength at 20° C. and a pH value of 3.6 was 9 centipoises.

Example 3

*Apparatus.*—Analogous to that described in Example 1.

An oil-in-water emulsion was prepared by stirring 4750 parts of carbon tetrachloride, 50 parts of a hydroxyethylated cyclic anhydrosorbitol monolauric acid ester with a solution of 780 parts of acrylamide in 780 parts of water.

After addition of 0.1 part of potassium persulfate and 0.1 part of sodium metabisulfite, both of which were dissolved in 5 parts of water, the emulsion was polymerized and worked up in the manner described in Example 1.

The viscosity of an aqueous solution of 1% strength of the product at 20° C. was 33 centipoises.

A comparison of the viscosity of the product obtained according to this example with the viscosity of the polyacrylamide prepared according to Example 1 with the same quantity of activator under analogous conditions shows that according to the process of the present invention the polymerization can be carried out in the presence of carbon tetrachloride without yielding products having a reduced viscosity.

Example 4

The experiment was carried out in an apparatus analogous to that described in Example 1. An oil-in-water emulsion was prepared from 300 parts of n-hexane in which 3 parts of a hydroxyethylated cyclic anhydrosorbitol mono-oleic acid ester were dissolved and from 70 parts of acrylamide and 10 parts of vinyl acetate, both of which were dissolved in 78 parts of water.

The activator system which was added comprised solutions of 0.01 part of potassium persulfate in 3 parts of water and 0.01 part of sodium metabisulfite in 3 parts of water.

One fifth of the emulsion was heated to 60° C. in the polymerization vessel and then one fifth of each of the two activator solutions was added.

After the polymerization had been initiated the remaining four fifths of the emulsion and simultaneously, but separately, the remaining four fifths of each of the two activator solutions were introduced into the polymerization vessel in the course of about 1.5 hours.

During this operation the polymerization vessel was kept at such a temperature that no reflux could be observed in the condenser during the exothermic reaction.

When the addition of the emulsion and of the activator solution was terminated the batch was kept for another hour at reflux temperature.

The batch was worked up in the manner described in Example 1.

The resulting granular polymer was soluble in water and yielded clear solutions. The viscosity of an aqueous solution of 1% strength of the copolymer at 20° C. was 39 centipoises. Residual content of monomers 0.4%, content of nitrogen 17.6% (pure polyacrylic acid amide 19.8%).

Example 5

The experiment was carried out in the apparatus described in Example 1. An oil-in-water emulsion was prepared, while stirring, from 4000 parts of carbon tetrachloride in which 30 parts of nonyl phenol which had been hydroxyethylated with 23 mols of ethylene oxide were dissolved and from a solution comprising 700 parts of acrylamide, 104 parts of the sodium salt of acrylic acid, 0.1 part of the sodium salt of ethylene diaminotetraacetic acid in 780 parts of water.

The polymerization was activated by means of a solution of 0.1 part of potassium persulfate in 20 parts of water, this solution being introduced into the polymerization vessel in an aliquot proportion drop by drop, separately from the emulsion, in the course of the reaction.

One fifth of the emulsion was placed into the polymerization vessel together with the corresponding quantity of activator solution before the beginning of the polymerization and heated to 65° C. Polymerization started after about 30 minutes whereupon the remaining portion of the emulsion and the activator solution were added in the course of about 2 hours.

The batch was then maintained for another hour at reflux temperature (67° C.).

The batch was worked up in the manner described in Example 1.

The copolymer consisted of a granular product, the grains of which had a diameter within the range of 0.5 to 1.5 millimeters.

The copolymer contained 0.6% of residual monomer.

The viscosity of a solution of 1% strength of the product in water at a pH value of 9 amounted to 324 centipoises.

The viscosity of a solution of 1% strength of the product in water at a pH value of 6 amounted to 118 centipoises.

The viscosity of a solution of 1% strength of the product in water at a pH value of 3 amounted to 25 centipoises.

In a more acid range, the copolymer precipitated from its aqueous solution.

*Example 6*

The experiment was carried out in an apparatus analogous to that described in Example 1.

3000 parts of petroleum ether boiling between 60° C. and 90° C. were placed into the polymerization vessel before the beginning of the polymerization.

A solution of 780 parts of acrylamide and 25 parts of nonyl phenol which had been hydroxyethylated with 14 mols of ethylene oxide in 780 parts of water and an activator solution of 0.15 part of potassium persulfate in 20 parts of water was prepared.

One-fifth of the monomer solution was added while stirring to the petroleum ether in the polymerization vessel and the whole was heated to 61° C.

A viscous oil-in-water emulsion formed which did not decompose when the petroleum ether boiled under reflux. After one-fifth of the activator solution had been added polymerization set in within a few minutes and swollen polyacrylamide particles formed from the oil-in-water emulsion. At this stage of the process the remaining four-fifths of the monomer solution and, simultaneously, the remaining portion of the activator solution were gradually introduced drop by drop into the polymerization vessel in the course of 1.5 hours.

The swollen granular polymer precipitated continuously from the oil-in-water solution which constantly formed anew. When the addition of the monomers and the activator had been terminated the batch was kept at reflux temperature (61° C.) for another 1.5 hours.

The batch was worked up in the manner described in Example 1.

The resulting polyacrylamide powder had a content of residual monomers of 0.2%. The viscosity of an aqueous solution of 1% strength of the product was 20 centipoises.

*Example 7*

The experiment was carried out in an apparatus analogous to that described in Example 1. Batch, procedure and working up were analogous to those described in Example 1, the differences being that instead of petroleum ether benzene and instead of nonyl phenol a hydroxyethylated monolauric acid ester of the cyclic anhydrosorbitol was used.

The granular polyacrylamide had a content of residual monomers of 0.8%.

The viscosity of an aqueous solution of 1% strength at 20° C. was 22 centipoises.

We claim:

1. An oil-in-water polymerization process for preparing water-soluble polymers by polymerizing up to two members selected from the group consisting of vinyl, acrylic and methacrylic monomers, said monomers being soluble in water at any ratio, which comprises emulsifying from about 0.5 to 10 parts by weight of an organic solvent, which solvent dissolves in water at 50° C. to an extent of less than about 15% by weight and has a boiling point such that the boiling point of the organic phase of the emulsion is below the boiling point of the aqueous phase, in one part by weight of an aqueous solution of said monomers while adding about 0.01% to 5% by weight of an emulsifier to prepare an oil-in-water emulsion, and polymerizing said monomers by adding a free radical forming polymerization catalyst while stirring said emulsion at a temperature within the range of about 30° to 100° C. to precipitate a granular polymer.

2. A process according to claim 1 wherein said solvent is a chlorinated hydrocarbon having a boiling point below about 100° C.

3. A process according to claim 1 wherein said emulsifier is a non-ionic polyhydroxyethylated emulsifier.

4. A process as claimed in claim 1 wherein acrylamide is polymerized.

5. A process as claimed in claim 1 wherein methacrylamide is polymerized.

6. A process as claimed in claim 1 wherein acrylic acid is polymerized.

7. A process as claimed in claim 1 wherein methacrylic acid is polymerized.

8. A process as claimed in claim 1 wherein ethenesulfonic acid is polymerized.

9. A process as claimed in claim 1 wherein a N-substituted acrylamide is polymerized.

10. A process as claimed in claim 1 wherein a N-substituted methacrylamide is polymerized.

11. A process as claimed in claim 1 wherein sulfonated styrene is polymerized.

12. An oil-in-water polymerization process for preparing water-soluble polymers by polymerizing up to two members selected from the group consisting of vinyl, acrylic and methacrylic monomers, said monomers being soluble in water at any ratio, which comprises emulsifying from about 0.5 to 10 parts by weight of an organic solvent, which solvent dissolves in water at 50° C. to an extent of less than about 15% by weight and has a boiling point such that the boiling point of the organic phase of the emulsion is below the boiling point of the aqueous phase, in one part by weight of an aqueous solution of said monomers and a minor amount of a monomer which is sparingly soluble in water to an extent that the polymers formed remain soluble in water at about 50° C. while adding about 0.01% to 5% by weight of an emulsifier to prepare an oil-in-water emulsion, and polymerizing said monomers by adding a free radical forming polymerization catalyst while stirring said emulsion at a temperature within the range of about 30° to 100° C. to precipitate a granular polymer.

13. A process according to claim 12 wherein said sparingly soluble monomer is a member selected from the group consisting of acrylonitrile, methacrylonitrile, esters of vinyl alcohol and saturated aliphatic monocarboxylic acids containing 1 to 4 carbon atoms, and esters of acrylic acid and methacrylic acid with saturated aliphatic monohydric alcohols containing 1 to 4 carbon atoms.

14. A process as claimed in claim 12 wherein a mixture of acrylamide with maleic acid diamide is polymerized.

15. A process as claimed in claim 12 wherein a mixture of acrylamide with crotonic acid is polymerized.

16. A process as claimed in claim 12 wherein a mixture of acrylamide with a minor amount of vinyl acetate is polymerized.

References Cited by the Examiner

UNITED STATES PATENTS

| | | | |
|---|---|---|---|
| 2,300,920 | 11/42 | Heuer | 260—79.3 |
| 2,592,248 | 4/52 | Coover et al. | 260—79.3 |
| 2,616,917 | 11/52 | Coover et al. | 260—79.3 |
| 2,840,549 | 6/58 | McNulty et al. | 260—80 |
| 2,908,668 | 10/59 | Reynolds et al. | 260—89.7 |
| 2,982,749 | 5/61 | Friedrich et al. | 260—80 |

JOSEPH L. SCHOFER, *Primary Examiner.*

J. R. LIBERMAN, LEON J. BERCOVITZ, *Examiners.*